N. DEERR.
APPARATUS FOR MACERATING BAGASSE.
APPLICATION FILED NOV. 26, 1917.
1,346,594.
Patented July 13, 1920.
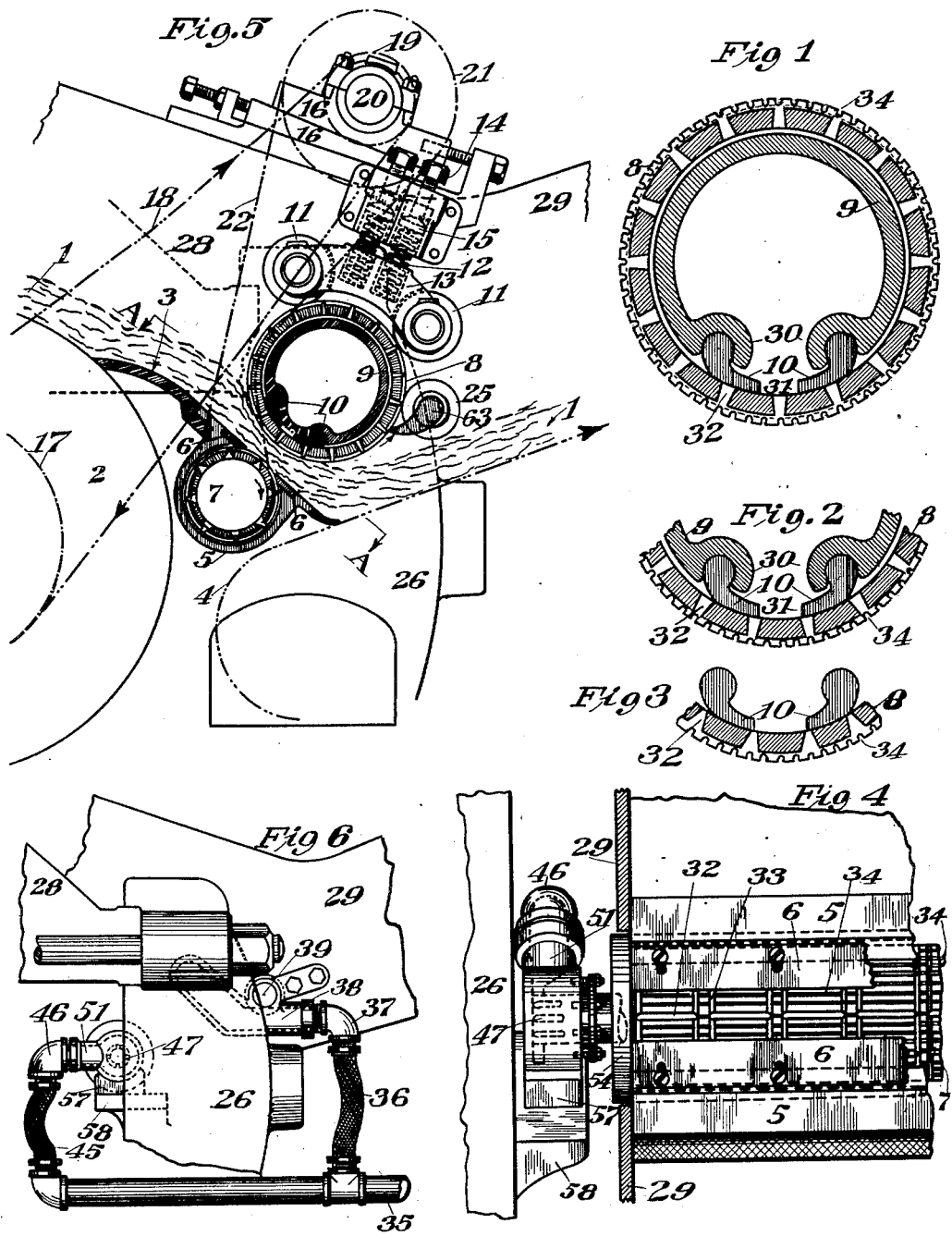

N. DEERR.
APPARATUS FOR MACERATING BAGASSE.
APPLICATION FILED NOV. 26, 1917.
1,346,594.
Patented July 13, 1920.
5 SHEETS—SHEET 2.
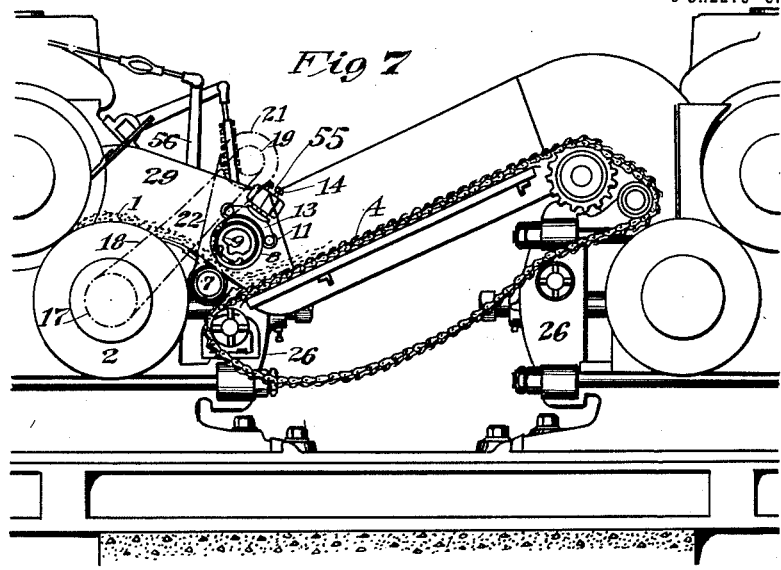
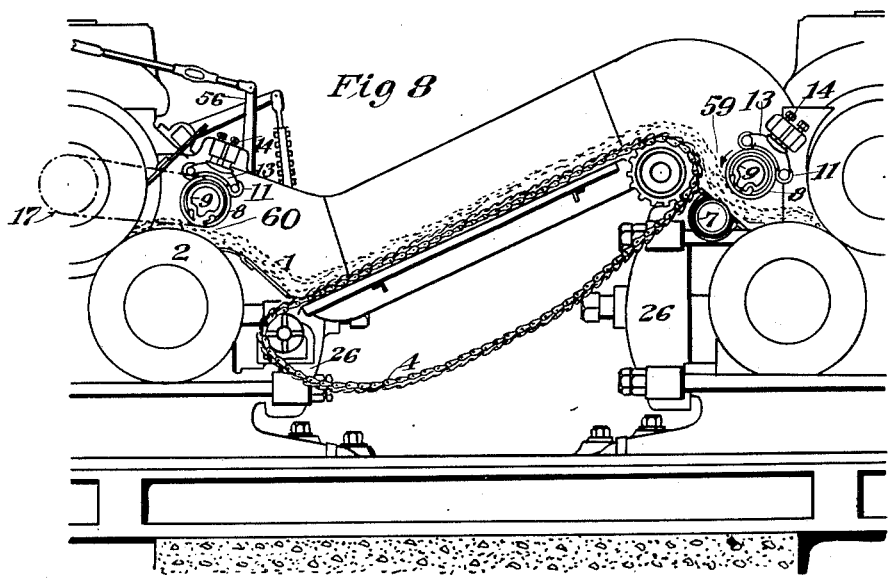

N. DEERR.
APPARATUS FOR MACERATING BAGASSE.
APPLICATION FILED NOV. 26, 1917.
1,346,594.
Patented July 13, 1920.
5 SHEETS—SHEET 3.
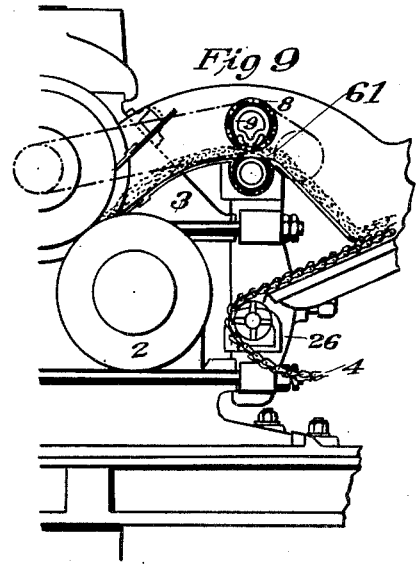
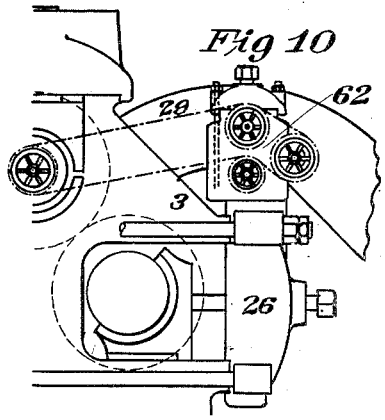
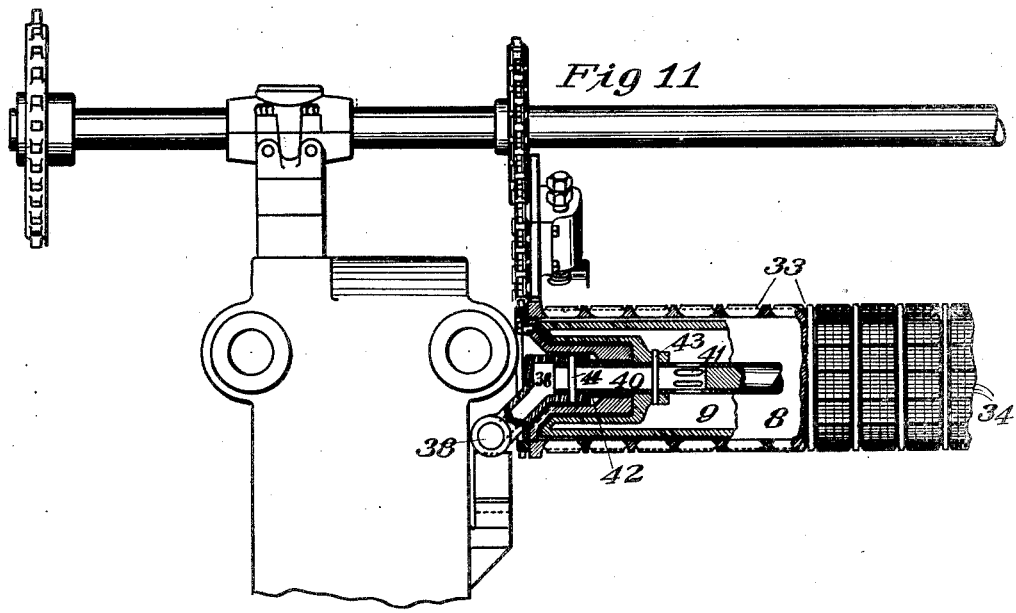

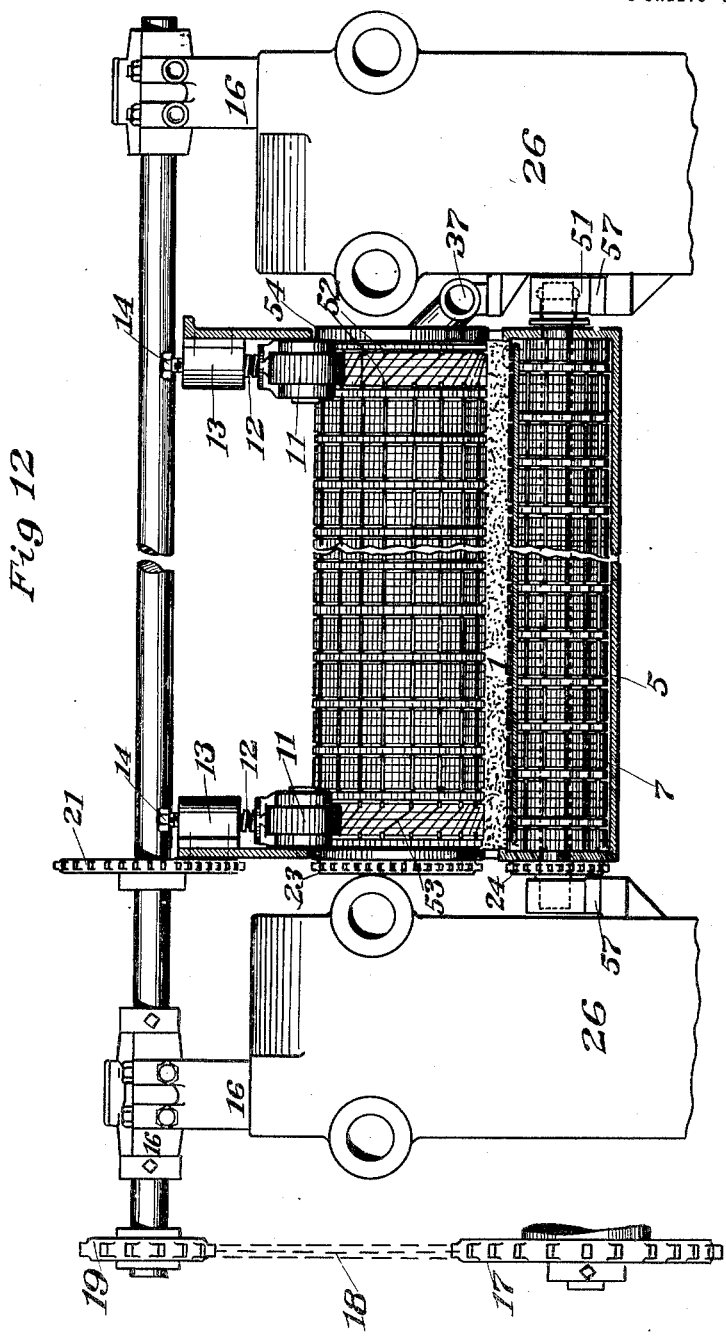

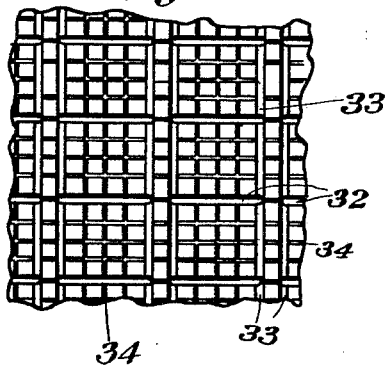
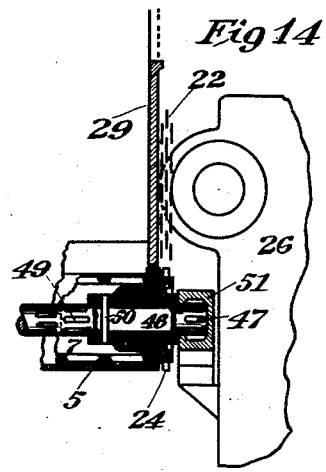
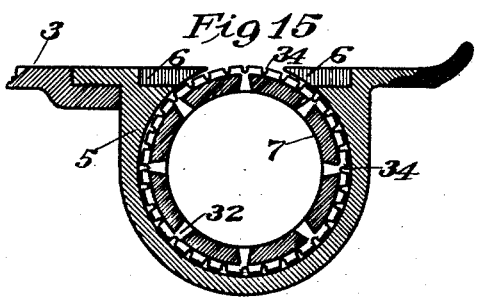
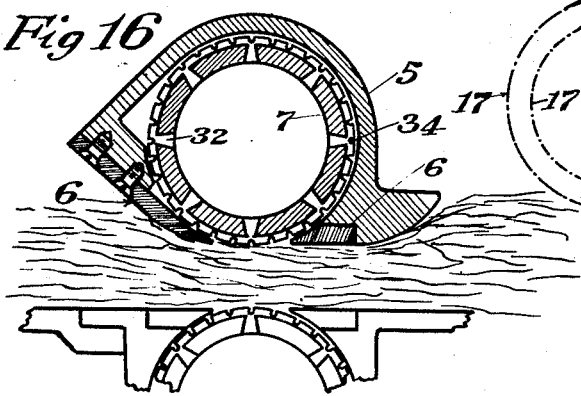
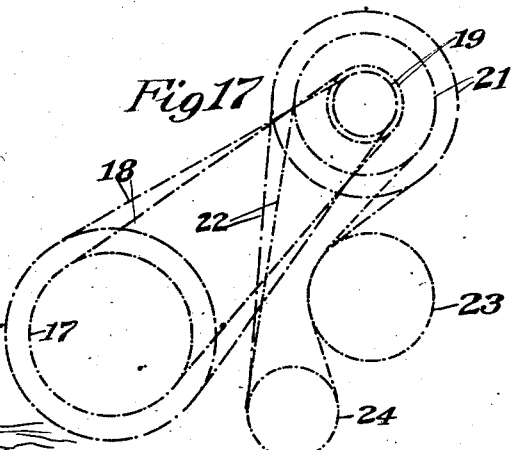

UNITED STATES PATENT OFFICE.

NOËL DEERR, OF BROOKLYN, NEW YORK.

APPARATUS FOR MACERATING BAGASSE.

1,346,594.   Specification of Letters Patent.   Patented July 13, 1920.

Application filed November 26, 1917. Serial No. 204,064.

*To all whom it may concern:*

Be it known that I, NOËL DEERR, a subject of the King of Great Britain, residing at 28 Fort Greene Place, in the borough of Brooklyn, county of Kings, State of New York, have invented certain new and useful Apparatus for Macerating Bagasse; and I do declare the following to be a full, clear, and exact description of the invention, such as will enable others skilled in the art to which it appertains to make and to use the same.

My invention relates to means for supplying water, or dilute juice of the sugar cane, to bagasse, (or crushed sugar cane,) from which all, or nearly all, of the juice capable of expression by pressure has already been obtained. When this bagasse to which water or dilute juice of the sugar cane has been supplied is again pressed a further quantity of juice is obtained.

The object of my invention is to supply this water, or dilute juice of the sugar cane, in a more efficient way than has been done heretofore, so that the admixture of the water, or dilute juice of the sugar cane, with the unexpressed juice remaining in the bagasse is more complete than has been possible heretofore.

My invention consists in a mechanism operating on a novel principle and in other features and elements used therewith, including also various details of construction.

In order to make my invention clear I will briefly describe the process of extracting juice from the sugar cane as it is usually performed.

In the process for extracting juice from the sugar cane, it is customary to squeeze the sugar cane in a series of rolling mills. After the material has undergone a certain pressure, no more juice can be expressed by pressure alone, although on an average only about 80% of the total quantity of juice has been expressed. It is customary to allow the crushed sugar cane or bagasse to absorb water, and to again squeeze the material, when a further portion of diluted juice is obtained; this process is known as maceration, saturation, imbibition or dilution by those skilled in the art.

Instead of using only water it is customary to use also dilute juice, expressed from a later mill of the train of mills, as the macerating agent at an earlier mill: this process is called "compound maceration" by those familiar with the art; thus if the last mill of a train of mills be called the $n$th mill, water will be only used in front of that mill; the dilute juice expressed by the $n$th mill will be used as the macerating agent in front of the $(n-1)$th mill and the dilute juice expressed by the $(n-1)$th mill in front of the $(n-2)$th mill and so on.

My invention is equally applicable to maceration with water or dilute juice and in my specification when I use the term liquid I refer to both water or dilute juice used as a macerating agent.

In my specification I have described my invention in reference to a train of mills of two units only, but it is to be understood that my invention is applicable to a train of mills of any number of units.

Previously it has been the custom when macerating bagasse to allow the liquid to fall upon the bagasse from a perforated pipe or sawcut trough; I have found out that when maceration is carried out in this way that the admixture of the liquid with the residual juice in the bagasse is very small, so that a considerable proportion of the value of the increased amount of sugar obtained is expended in the expense of evaporating the liquid.

Using my invention, I obtain a more complete admixture of the liquid with the residual juice in the bagasse, and with the same quantity of liquid a greater quantity of sugar will be obtained.

Again in the ordinary process of maceration it is customary to apply the liquid to the bagasse in an unconfined condition; I have found that there is a more complete admixture of the liquid with the residual juice in the bagasse, when the latter is under pressure at the time when it is in contact with the liquid; moreover I have determined the most efficient pressure and I find it to be about 40 lbs. on the square inch; at lower pressures than this the liquid does not penetrate completely, due to the loose packing of the fibers and at higher pressures the bagasse becomes so compacted that penetration of the liquid is again lessened. I have also found that the admixture of the liquid with the residual juice is greater when the former is under pressure when it comes in contact with the bagasse.

In my invention, means are provided to apply a pressure to the bagasse simultaneously with the time during which liquid is supplied to the bagasse, the said liquid being under pressure at the moment when it comes in contact with the bagasse.

Again, I have found out by experiments that the absorption of liquid by bagasse is more uniform when the bagasse is presented to the liquid in a thin layer. My invention supplies means for diminishing the thickness of the layer of bagasse at the time during which it is in contact with the liquid.

In my invention I use a device consisting of horizontal hollow concentric drums one complete and one incomplete; the system may be single or a pair of concentric drums may be used, of which one acts superior to, and the other acts inferior to the bagasse. The concentric drums consist of two elements; one rotating about its longitudinal axis and which is always the complete drum and one stationary which is always the incomplete drum; the rotating element is perforated over all parts of its curved surface; the stationary element is not perforated, and is incomplete in the sense that an opening parallel to the axis of the drum and extending from end to end of the drum is formed in and through the curved surface of the same. The relative positions of the rotating and stationary elements are interchangeable; that is to say:—the rotating element may be exterior to and may completely envelop the stationary element or the stationary element may be exterior to and may partly envelop the rotating element. The liquid under pressure is admitted to the interior of the inner element and can only escape by way of the opening in the stationary element, and those perforations in the rotating element which come opposite to and adjacent to the opening in the stationary element.

The system of concentric drums is arranged one superior to and one inferior to the blanket of bagasse as it travels from one mill of a train of mills to the next one in series, and in their rotation draw the blanket of bagasse between them. In its passage between the drums the blanket of bagasse is subjected to a controllable pressure and simultaneously seals the perforations in the rotating drums, whereby the pressure of the liquid is maintained over the time that the bagasse is in contact with the diluent.

The speed of rotation of the drums is made variable at the will of the operator and as the speed is increased the thickness of the layer of bagasse drawn between the drums is diminished resulting in a more efficient absorption of the liquid which is supplied to the bagasse in passage between the drums.

The above described arrangement forms the essential part of my invention.

In order to make my invention more readily understood it is illustrated in the accompanying drawings wherein similar characters throughout designate corresponding parts.

Figure 1, Sheet 1, is a cross section through the hollow concentric drums with the complete perforated rotating drum exterior to the incomplete stationary drum.

Fig. 2, Sheet 1, is a portion of Fig. 1 showing a different position of the rotating drum.

Fig. 3, Sheet 1, is a portion of Fig. 1 showing a different form of the perforations.

Fig. 4, Sheet 1, is a view in plan taken along the line A—A, Fig. 5, of a system of drums with the rotating perforated complete drum interior to the stationary incomplete drum.

Fig. 5, Sheet 1, is a cross section through one type of the complete apparatus, arranged with the system of the rotating perforated complete drum exterior to the incomplete stationary drum superior to the blanket of bagasse, and with the system of the rotating perforated complete drum interior to the incomplete stationary drum inferior to the blanket of bagasse.

Fig. 6, Sheet 1, is an elevation showing the liquid connections to the system of drums.

Fig. 7, Sheet 2, is a cross section through a sugar cane milling plant showing the system of drums in place and in relation to the mills and bagasse conveyer, as designed to fit it with milling plants already in operation, as well as in new milling plants.

Fig. 8, Sheet 2, is a cross section through a sugar cane milling plant showing two alternative locations of the system of drums in relation to the mills and bagasse conveyer as designed to fit in with milling plants already in operation, or for use in new milling plants.

Figs. 9 and 10, Sheet 3, are section and elevation of the system of drums as they would be preferably located in designing a new plant.

Many old mills however permit of this type and location of macerating device.

Note that both sets of macerating drums are shown in these figures entirely above the mill side caps 26.

To avoid a repetition of drawings in which views would be almost identically the same, it will be easily understood that the lower set of drums may easily be lowered to a position at or below the top edge of the top of the mill side caps 26 thus making the blanket of bagasse travel in an approximately horizontal plane instead of diagonally upward as shown in Figs. 9 and 10.

Fig. 11, Sheet 3, is a part longitudinal section and part longitudinal elevation of the upper system of drums, (Fig. 5, Sheet 1) showing in section the bearings and diluent connections to the stationary incomplete inner drum and in elevation the grooved surface of the exterior rotating perforated complete drum.

Fig. 12, Sheet 4, is a longitudinal elevation of one type of the complete apparatus, corresponding with the cross section shown in Fig. 5, Sheet 1, but slightly distorted to show the invention more clearly.

Fig. 13, Sheet 5, is a view of a portion of the surface of a rotating perforated complete drum as developed upon a plane surface.

Fig. 14, Sheet 5, is a longitudinal section showing the drive, bearing, liquid connections of the lower system of drums corresponding to the cross section in Fig. 5, Sheet 1.

Fig. 15, Sheet 5, is a cross section through the hollow concentric drums with the complete perforated rotating drum interior to the incomplete stationary drum.

Fig. 16, Sheet 5, is a cross section through the hollow concentric drums with the complete perforated rotating drum interior to the incomplete stationary drum: the mechanism however designed for operation above the blanket of bagasse.

Fig. 17, Sheet 5, is a diagram of the driving gear showing how by changing the sprockets on the rotating drums or by altering the driving sprocket, any desired speed of rotation can be obtained.

Referring to the drawings 1 is the blanket of bagasse shown traveling from left to right; it will be noted by referring to Fig. 5 that the bagasse between the rotating macerating drums is shown in a thinner layer than the bagasse entering or leaving the drum; 2 is the back roller of a cane mill of usual construction; 3 is a scraper coacting with the surface of the back roller; it is attached to the stationary incomplete drum 5 and any wear at the edge of the scraper, due to the grinding action of the mill roll 2, is taken up by rotating the incomplete drum 5 slightly about its longitudinal axis; 4 is the bagasse conveyer which transports the bagasse 1 from one mill to the next in series: 5 is the outer stationary incomplete drum of the lower system of drums.

Its function is to permit the liquid contained in the inner rotating drum 7 to escape only at those perforations which in turn come opposite to and adjacent to the opening in the incomplete outer drum 5; it is stationary only in the sense that it has no movement when the macerating drums are in operation; as previously described however, it is necessary that this incomplete drum be made to partially rotate upon its longitudinal axis and to this end bearing blocks, 57, supported on lugs, 58, of the mill side caps, 26, are provided; 6 is a renewable plate forming part of the incomplete drum and determining the width of the opening in contact with the bagasse; 7 is the inner rotating complete perforated drum of the lower system of drums; 8 is the outer rotating complete perforated drum of the upper system of drums: the drums 7 and 8 are caused to rotate in opposite directions whereby they draw the bagasse forward and deliver it to the conveyer 4; 9 is the inner stationary incomplete drum of the upper system of drums; it performs the same function as the drum 5 performs in the lower system of drums; it is stationary only in the sense that it has no rotary movement. Obstructions in the bagasse such as pieces of iron or other foreign matter or even great thicknesses of bagasse require a vertical and automatically adjustable movement of the entire upper system of drums. Means for accomplishing this slight variation in vertical position will be described later, 10 are pawl shaped plates extending from end to end of the drum and coacting with both inner and outer drum; they serve to make a watertight joint between the inner and outer drum since the pressure of the liquid contained in the inner drum acts on their inner surface and presses the pawls against the inner surface of the outer drum.

The pawls being free to oscillate a few degrees because of the nature of their construction, prevent particles of bagasse from accumulating between the inner surface of the rotating drum 8 and the exterior surface of the stationary incomplete drum 9 in proximity of the pawls, for as soon as the pressure, due to particles of bagasse in the opening between the rotating drum and the stationary drum, exceeds the pressure exerted on the pawls by the water, the pawls lift a short distance and permit any accumulation of bagasse to pass to their intended exit at 31 where the maceration water will flush them out; 11 are rollers bearing on the surface of the drum 8; 12 is a spring acting on the rollers 11; 13 is a casting holding the rollers 11; 14 are screw bolts acting on the button 15; the screw bolts control the tension in the spring 12 and thereby the pressure exerted by the upper system of drums upon the blanket of bagasse.

The screws 14 acting in the manner above described afford a means for regulating the pressure which is applied to the bagasse, but the weight of the entire upper drums, in some designs, can be adapted to bear on the blanket of moving bagasse. By referring to Fig. 5, it is seen that there is nothing preventing the rotating drum 8 together with its interior parts from "rolling downhill" on the blanket of bagasse except the rollers 25 located at or near each end of the upper rotating drum 8.

It is thus easily understood that the weight of the drums plus any weight or pressure due to the springs is applied entirely to the bagasse in transit in a manner using a minimum of energy, for all pressure surfaces are in roller contact; 16 is an adjustable bearing of known construction carrying the mechanism serving to drive the system of rotating drums; 17 is the pitch circle of a sprocket wheel attached to and rotating with the back roller of the mill; by means of the chain 18 indicated diagrammatically it drives the sprocket 19, indicated by its pitch circle on the shaft 20, which carries a second sprocket 21, indicated by its pitch circle, and which, by means of a chain 22, indicated diagrammatically, drives the sprockets 23 and 24, indicated by their pitch circles, and which are connected rigidly to the rotating elements 7 and 8 of the system of drums; 25 is a roller supported in the side frame of the bagasse conveyer and coacting with the upper system of drums which it supports.

As shown in Fig. 5, the sprockets indicated by their pitch circles are of such diameter that both the upper and lower rotating elements move at the same circumferential speed as does the back roller 2 of the mill, and also as does the bagasse 1. By making the sprockets indicated by its pitch circle 17 of larger diameter, or by making the sprocket indicated by its pitch circle 20 of smaller diameter, the circumferential speed of the rotating elements 8 and 7 can be increased, so that the speed of the bagasse in its passage between the rotating elements 8 and 7 is also increased and thereby its thickness is diminished. 25 is a roller as before stated supported in the side frame 29 of the bagasse conveyer, 4, coacting with the upper system of drums, it serves to restrain the upper system of drums from moving laterally; 26 is a side cap for the back roller of a mill; 28 is a portion of the mill housing; 29 is the side frame of the bagasse conveyer. 30 is the opening in the incomplete inner drum 9; 31 is the opening between the pawls 10; 32 are the perforations in the rotating drum 8; water or dilute juice introduced into the interior of the inner drum will flow out through those perforations which in turn come opposite to and adjacent to the opening in the incomplete drum and is prevented from reaching the other perforations by means of the pawls, 10, and the wall of the incomplete stationary drum; 33 are relatively deep circumferential grooves formed on the surface of the rotating drums 7 and 8; 34 are relatively shallow grooves both circumferential and parallel to the axis of the drum.

The combination of these grooves is such as to form a system of truncated pyramids on the surfaces of the rotating elements; the grooves 33 and 34 communicate with each other and receive liquid from the perforations 32; the whole system of grooves forms a complete wetted surface in contact with the bagasse; 35 is the main liquid header conveying the liquid by means of the flexible connection 36 to the piping 37 and thence through the casting 38 which swivels at 39 to the hollow shaft 40 of the upper system of drums; it is necessary that the piping has some play to allow for the movement of the upper system of drums with variation in the thickness of the blanket of bagasse, for this purpose the flexible connection 36 and the swivel points 39 are provided; 41 are perforations in the hollow shaft 40, through which water reaches the interior of the inner drum; 42 is a bushing around the shaft 40 and insures correct alinement of the shaft with the rotating drum 8; 43 and 44 are fasteners shown as pins holding together the hollow shaft 40, the incomplete stationary drum 9 and the casting 38; 45 is a flexible connection conveying water or dilute juice by the pipe 46 to the perforations 47 in the hollow rotating shaft 48 to other perforations 49 and thence to the interior of the rotating inner drum 7; 50 is a pin attaching the shaft 48 to the drum 7; 51 is a bearing carrying the rotating shaft and also serving as a liquid distributing compartment to the shaft 48; 52 are perforations at the ends of the upper rotating drum replacing the slots employed elsewhere so as to afford a uniform bearing surface for the rollers 11; 53 are diagonal communicating grooves; 54 is a flange on the rotating drum coacting with the rolls 35; 55 shows the location of a pair of drums in relation to a pair of mills and corresponds to the detailed drawing in Fig. 5; 56 is a lever for adjusting the position of the scraper 3, attached to the outer drum 5 of the lower system of drums; 57 is a block which carries the casting 51 and is itself carried on the lug 58 on the side cap 26 of the back roller 2; the adjustment of the scraper is necessary in every mill and by means of the block 57 the whole lower system of drums can be rotated about its center point; 59 shows a second location of the system of drums; 60 shows a third location in which only the upper part of the system is used; 61 is another location of the drums carried on bearings arranged on the side cap 26; 62 is a side elevation of the arrangement shown in 61.

The rotating elements acting under pressure would soon become clogged with bagasse if it were not for the pawl shaped scraper, 63, and one of the adjustable plates, 6, which also acts in the capacity of a scraper.

The nature of the grooves 33 and 34 is such that the actual scraping of the rotating elements 7 and 8 is easily accomplished.

The scrapers extend across the entire length of the rotating elements.

The system of supplying liquid to bagasse by my invention is then as follows:—Bagasse on discharge from a mill travels forward until it reaches the rotating elements moving in opposite directions with respect to each other; it is gripped by these rotating elements and carried forward; as it is carried forward it is compressed; simultaneously it is supplied with liquid under pressure, being in actual contact with liquid under pressure while it is itself compressed. The liquid under pressure is distributed over the upper and lower surfaces of the bagasse by a system of grooves, forming on the surfaces of the rotating elements a series of truncated pyramids.

It will be easily understood that the nature of my invention is such that many modifications can be made and still be under the spirit and scope of my claims, for instance:—many modifications as to location of the two types of rotating elements are possible, one modification is shown in Fig. 16, Sheet 5; other modifications would consist of the two types of rotating elements interchanged from the locations illustrated, the one element shown above the blanket of bagasse to be installed below the bagasse and vice versa.

Other locations for the maceration device in respect to the mills are easily obtained but are claimed under the spirit of my invention.

I have described my invention as pertaining to apparatus for macerating bagasse or the fiber substance of the sugar cane. By the meaning of sugar cane I refer to any of the sugar producing plants or grasses which are in great variety. Sorghum is one of the commoner kinds of canes which produce sugar. I do not limit myself to cane fiber alone but my invention is intended to include a device for macerating any sugar bearing vegetation from which it is possible to recover sugar juices through the use of mills which express the juice under heavy pressure.

Having now described my invention what I claim is:—

1. In an apparatus for macerating bagasse, in combination, a perforated rotating element, means for rotating said element, means for supplying liquid to the interior of said rotating element and means for distributing the liquid to the bagasse.

2. In an apparatus for macerating bagasse, in transit between sugar cane mills in combination with a rotating element arranged to supply liquid to the under side of a surface of bagasse, a perforated rotating element located above the upper surface of the bagasse with means for rotating said element, means for supplying liquid to the interior of said element and means for distributing the liquid to the upper surface of the bagasse.

3. In an apparatus for macerating bagasse in transit between sugar cane mills, in combination with a rotating element arranged to supply liquid to the upper side of a surface of bagasse, a perforated rotating element located below the lower surface of the bagasse with means for rotating said element, means for supplying liquid to the interior of said element and means for distributing the liquid to the lower surface of the bagasse.

4. In an apparatus for macerating bagasse in transit between sugar cane mills, in combination, perforated rotating elements, located above and below the moving bagasse to supply liquid to the upper and lower surfaces of the bagasse by means of a plurality of perforations spaced throughout and along the shells of the rotating elements; means for supplying liquid to the interior of said rotating elements, means for rotating said rotating elements and means for restraining the liquid from being discharged, except at the points in contact with the bagasse, substantially as shown and described.

5. In an apparatus for macerating bagasse in transit from one unit of a train of sugar cane mills to the next unit in series, in combination, rotating elements one above and the other below the layer of bagasse, means for rotating said elements, means for supplying liquid to the interior of said rotating elements, and means for distributing the liquid to the upper and lower surfaces of the layer of bagasse between the said rotating elements.

6. In an apparatus for macerating bagasse, in combination, perforated rotating elements on the exterior surfaces of which are arranged grooves communicating with said perforations; means for rotating the rotating elements and means for supplying liquid to the interior of said rotating elements, substantially as shown or described.

7. In an apparatus for macerating bagasse, in combination with means for driving and supplying liquid to same, a perforated rotating element, on the exterior surface of which is arranged main grooves communicating with said perforations, other smaller grooves communicating with the main grooves; all grooves being so disposed that liquid after leaving the perforations in the shell of the rotating element is distributed over the entire surface of the rotating element, substantially as shown and described.

8. In an apparatus for supplying liquid to bagasse in transit from one unit of a train of mills to the next unit in series, perforated rotating complete drums and means for rotating same in combination with stationary incomplete drums, the rotating drums arranged to supply liquid to the bagasse and the stationary drums arranged to direct the course of the liquid to that portion of the rotating element in contact with the bagasse.

9. An apparatus for supplying liquid to bagasse including in combination means for macerating the lower surface of the bagasse, a liquid supplying rotating drum above the bagasse, a stationary incomplete drum within said rotating drum, and coöperating means for preventing the liquid escaping at any portion of the rotating drum except that in contact with the bagasse as the drum rotates.

10. An apparatus for supplying liquid to bagasse including in combination means for macerating the layer of bagasse from below, and means for macerating the layer of bagasse from above, said means comprising a rotating drum and a stationary incomplete drum therewithin, and devices preventing the escape of the liquid except where the drum contacts with the bagasse, said devices comprising pawl shaped plates extending along the edges of the incomplete drum and being maintained in contact with the interior of the rotating drum by gravity and hydrostatic pressure, means for rotating the drums and means for supplying liquid thereto.

11. In an apparatus for supplying liquid to bagasse in transit from one unit of a train of sugar cane mills to the next unit in series in combination with perforated rotating liquid supplying elements, means for rotating said elements, means for supplying and distributing the liquid to the bagasse and means for applying pressure to the rotating element superior to the bagasse whereby pressure is applied to the bagasse.

12. In an apparatus for supplying liquid to bagasse in transit from one unit of a train of sugar cane mills to the next unit in series in combination with perforated rotating liquid supplying elements, means for rotating said elements; means for supplying and distributing the liquid to the bagasse and means for applying pressure to the rotating element superior to the bagasse, said means including one or more roller bearings in the proximity of each end of the superior perforated rotating element, a resilient substance such as springs bearing on said roller bearings, compression of said spring being controllable, substantially as described.

13. In an apparatus for supplying liquid to bagasse in transit from one unit of a train of sugar cane mills to the next unit in series, in combination with perforated rotating liquid supplying elements, means for rotating said elements, means for supplying and distributing the liquid to the bagasse, means for applying pressure to the rotating element superior to the bagasse and means for applying pressure to the bagasse, said pressure being communicated to the bagasse through rollers from a resilient substance such as springs bearing through said rollers on the superior rotating element; substantially as shown and described.

14. In an apparatus for supplying liquid to bagasse in transit from one unit of a train of sugar cane mills to the next unit in series in combination, perforated rotating elements, means for rotating said elements, means for supplying liquid to the interior of said rotating elements, means for distributing the liquid to the bagasse and means for retaining the superior rotating element in position.

15. In an apparatus for supplying liquid to bagasse in transit from one unit of a train of sugar cane mills to the next unit in series in combination perforated rotating elements, means for rotating said elements, means for supplying liquid to the interior of said rotating elements, means for distributing the liquid to the bagasse and means for retaining the superior rotating element in position, said means including rollers located near the ends of the perforated rotating element, in contact with said perforated rotating element and located so as to prevent any lateral movement of said perforated rotating element while permitting vertical movement of said perforated rotating element.

16. In an apparatus for supplying liquid to bagasse in transit from one unit of a train of sugar cane mills to the next unit in series, in combination perforated rotating liquid supplying elements, means for rotating said elements, means for distributing the liquid to the bagasse at the line where perforated drum and bagasse are in contact and means for supplying liquid to the bagasse, said means incorporating a flexible connection through which the liquid may pass on its way to the rotating elements.

17. In an apparatus for supplying liquid to bagasse in transit from one unit of a train of sugar cane mills to the next unit in series in combination, perforated rotating elements, means for rotating said elements, means for supplying liquid to the interior of said rotating elements, means for distributing the liquid to the bagasse, means for supplying liquid to the rotating elements incorporating flexible connections through which the liquid must pass, said flexibility of connections being sufficient to allow of a vertical movement in respect of said rotating elements.

18. An apparatus for supplying liquid to bagasse in transit from one unit of sugar cane mills to another including in combination upper and lower systems of coöperating rotating drums between which the bagasse passes, the drums applying liquid to the bagasse, means for rotating said drums, means for supplying liquid to the interior of the rotating drums, including a flexible connection to the lower system of drums to permit partial rotation of a lower drum about its axis.

19. In an apparatus for supplying liquid to bagasse in transit from one unit of a train of cane sugar mills to the next unit in series, in combination perforated rotating elements; means for rotating said elements, means for supplying liquid to the interior of said rotating elements, said means incorporating a pipe connection in communication with the perforated rotating element supplying liquid to the upper surface of the bagasse with means for permitting the pipe connection to swivel about a point substantially as shown and described.

20. In an apparatus for supplying liquid to bagasse in transit from one unit of a train of mills to the next unit in series, one of said mill units including a back roll, a perforated rotating complete drum external to an incomplete stationary drum with its said drum pressing on and supplying liquid to the bagasse located above the back roll of the mill, the surface of said back roll forming a rotating surface coacting with the rotating drum, means for rotating the perforated drum and means for distributing the liquid.

21. In an apparatus for supplying liquid to bagasse in transit from one unit of a train of mills to the next unit in series, in combination, rotating elements, means for supplying liquid to the interior of said rotating elements, means for distributing the liquid to the bagasse and means for causing the elements to rotate.

22. In an apparatus for supplying liquid to bagasse in transit from one unit of a train of sugar cane mills to the next unit in series, in combination, rotating elements, means for supplying liquid to the interior of said rotating elements, means for distributing liquid to the bagasse and means for compressing the bagasse.

23. In an apparatus for supplying liquid to bagasse in transit from one unit of a train of sugar cane mills to the next unit in series, in combination, rotating elements, means for supplying liquid to the interior of said rotating elements, means for distributing liquid to the bagasse and means for increasing the speed of the rotating elements to decrease the depth of the blanket of bagasse simultaneously with the delivery of the liquid thereto.

24. In an apparatus for supplying liquid to bagasse in transit from one unit of a train of mills to the next unit in series, in combination, rotating elements, means for supplying liquid to the interior of said rotating elements, means for distributing liquid to the bagasse, said means incorporating perforated drums on the exterior surface of which are arranged grooves communicating with said perforations, means for scraping said grooves, said means consisting of pawls coacting with said grooves.

25. In an apparatus for supplying liquid to bagasse in transit from one unit of a train of mills to the next in series, in combination, rotating elements, means for supplying liquid to the interior of said rotating elements, means for distributing liquid to the bagasse, said means incorporating perforated drums on the exterior of which are arranged circumferential grooves and longitudinal grooves at right angles to each other forming a series of truncated pyramids, substantially as shown and described.

26. In an apparatus for supplying liquid to bagasse in transit from one unit of a train of mills to the next unit in series in combination, rotating elements, means for supplying liquid to the interior of said rotating elements, means for distributing liquid to the bagasse, and means for applying pressure to the bagasse, said means incorporating rollers bearing on said rotating elements.

27. A cane mill including in combination means for supporting a blanket of bagasse and a rotating cylinder in engagement with the bagasse and supplying liquid thereto.

28. A cane mill including in combination means for supporting a blanket of bagasse and a hollow, perforate rotating cylinder in engagement with the bagasse and supplying liquid thereto, and means for supplying liquid to the interior of said cylinder.

29. A cane mill including in combination means for supplying a blanket of bagasse and a moving feeding and moistening device engaging the bagasse.

30. A cane mill including in combination means for supplying a blanket of bagasse and a rotating feeding and moistening drum engaging the bagasse.

31. A cane mill including in combination means for supplying a blanket of bagasse and opposed coöperating moving feeding and moistening devices engaging the blanket of bagasse above and below.

32. A cane mill including in combination means for supplying a blanket of bagasse and opposed coöperating rotating feeding and moistening drums engaging the blanket of bagasse above and below.

33. A cane mill including in combination means for supplying a blanket of bagasse and a bagasse moistening device adapted to supply liquid under pressure to the blanket of bagasse.

34. A cane mill including in combination means for supplying a blanket of bagasse and a moving bagasse moistening device adapted to supply liquid under pressure to the blanket of bagasse.

35. A cane mill including in combination means for supplying a blanket of bagasse and a bagasse moistening device having a rotating cylinder adapted to supply liquid under pressure to the blanket of bagasse.

36. A cane mill including in combination means for supplying a blanket of bagasse and a bagasse moistening device having sleeved perforate cylinders adapted to supply liquid under pressure to the blanket of bagasse.

37. A cane mill including in combination means for supplying a blanket of bagasse, a moistening and feeding device engaging the bagasse, and comprising intersleeved cylinders extending across the blanket of bagasse, one of said cylinders having a series of perforations extending longitudinally thereof on the side toward the bagasse, the other cylinder having perforations arranged entirely thereabout, and means for rotating one of said cylinders.

NOËL DEERR.

Witnesses:
  CHAS. H. STAAT,
  EDWARD S. MURPHY.